Feb. 12, 1935.  T. M. INGMAN ET AL  1,991,249
PROCESS OF AND APPARATUS FOR DEVELOPING FILM
Filed April 12, 1932   7 Sheets-Sheet 1

Fig. 1.

INVENTORS:
Thomas M. Ingman,
Frank E. Garbutt,
Leigh M. Griffith,
By
Fred W Lain
ATTORNEY.

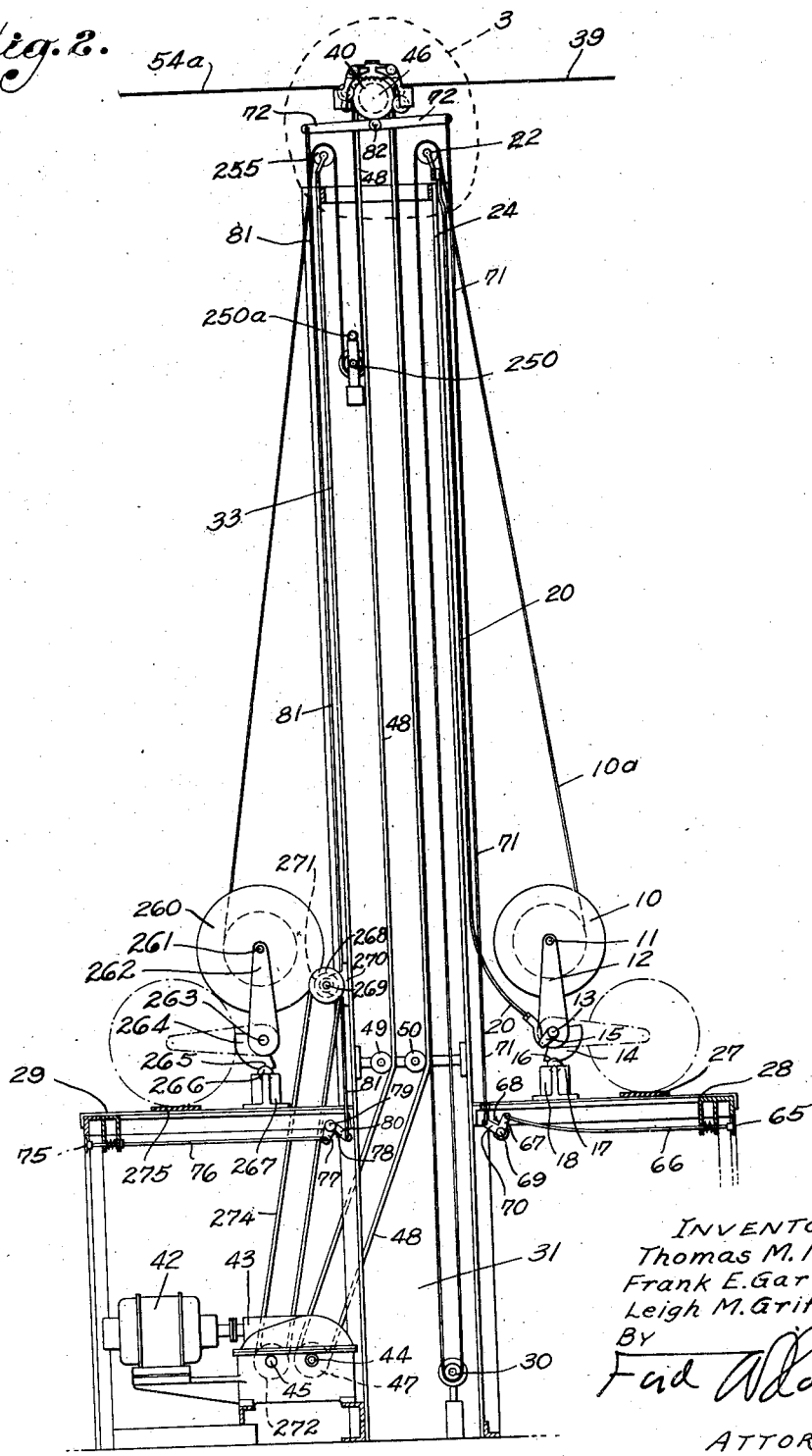

Feb. 12, 1935.  T. M. INGMAN ET AL  1,991,249
PROCESS OF AND APPARATUS FOR DEVELOPING FILM
Filed April 12, 1932   7 Sheets-Sheet 3
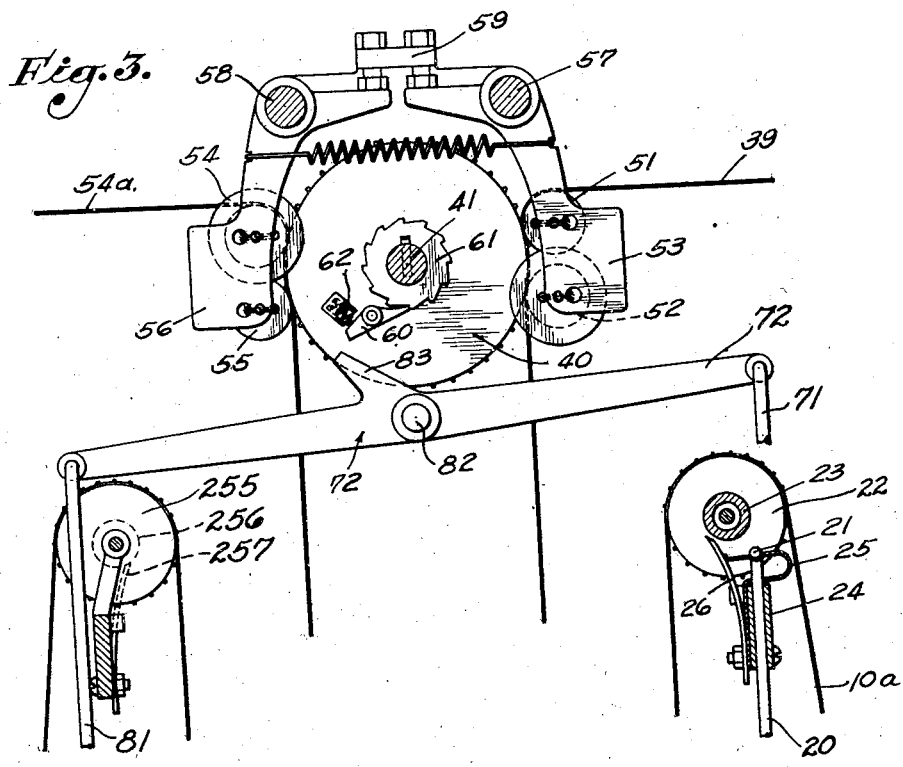
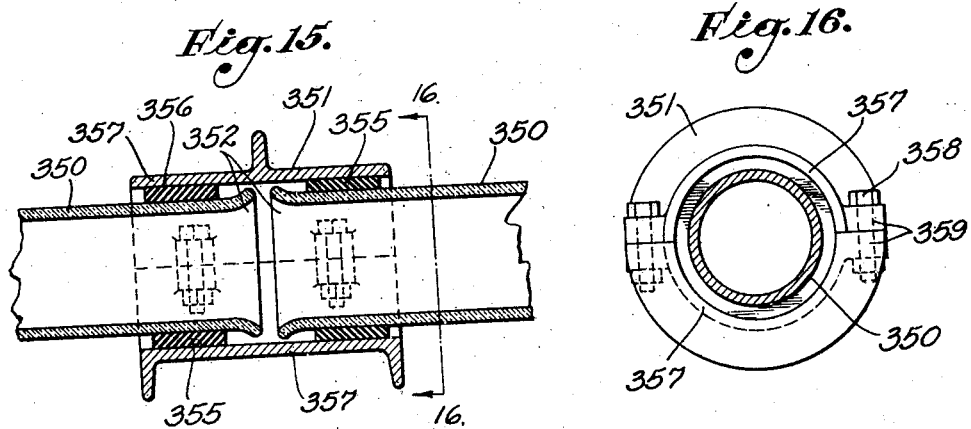
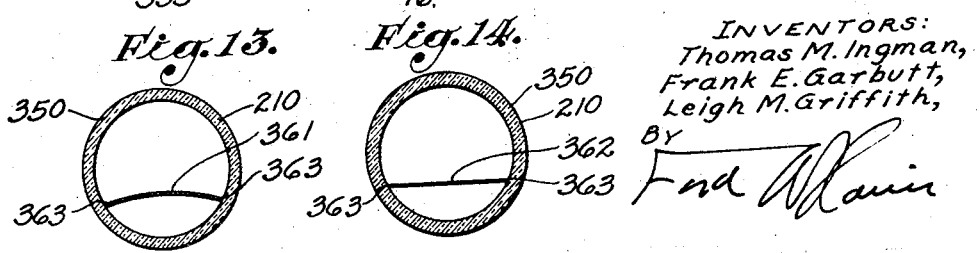
INVENTORS:
Thomas M. Ingman,
Frank E. Garbutt,
Leigh M. Griffith,
BY
ATTORNEY.

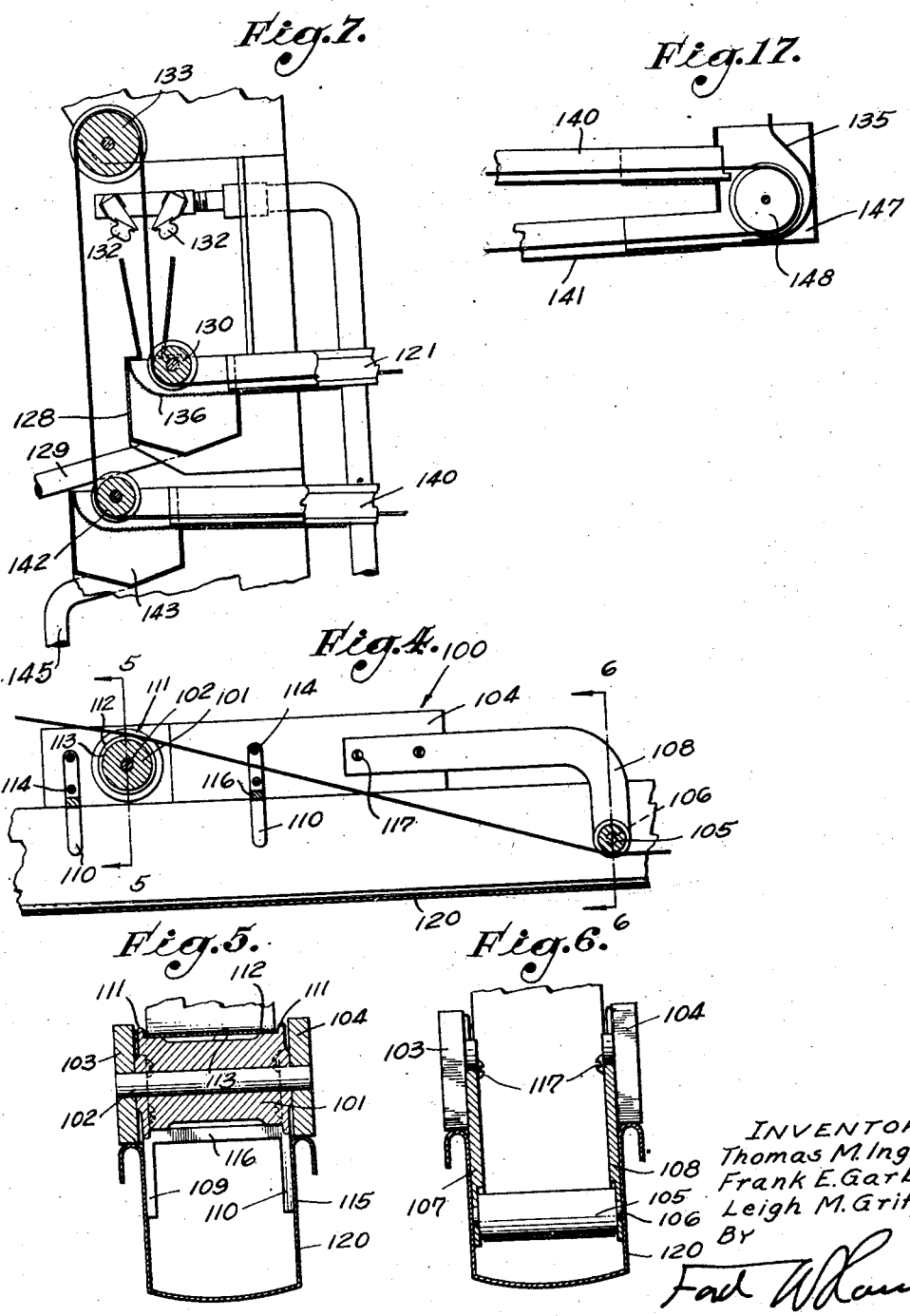

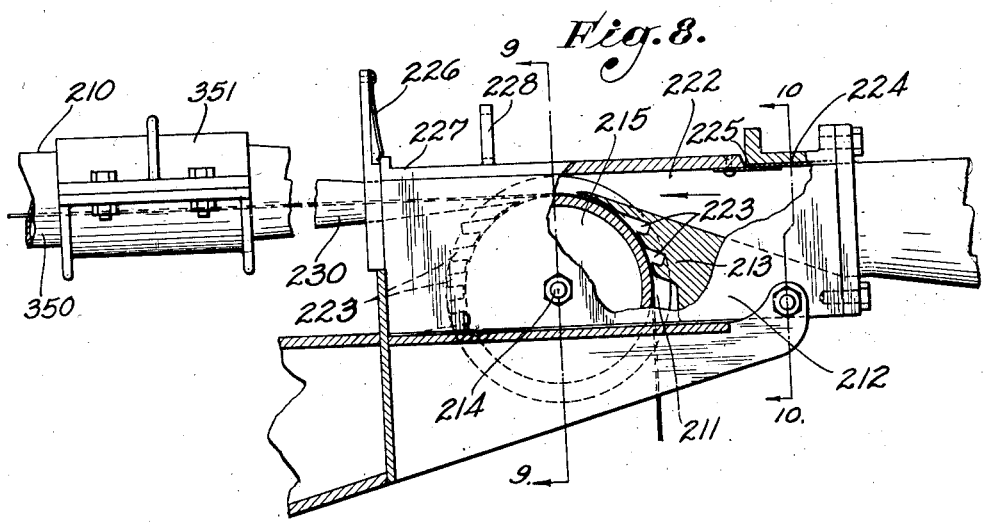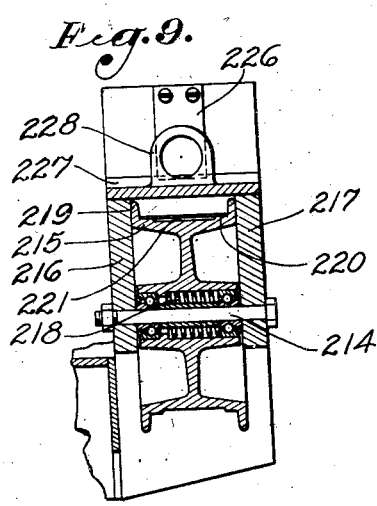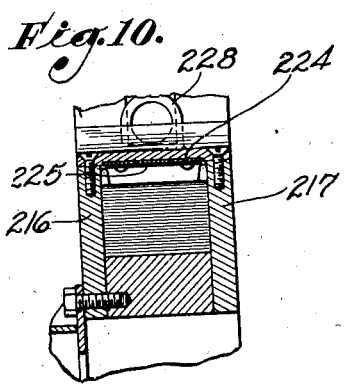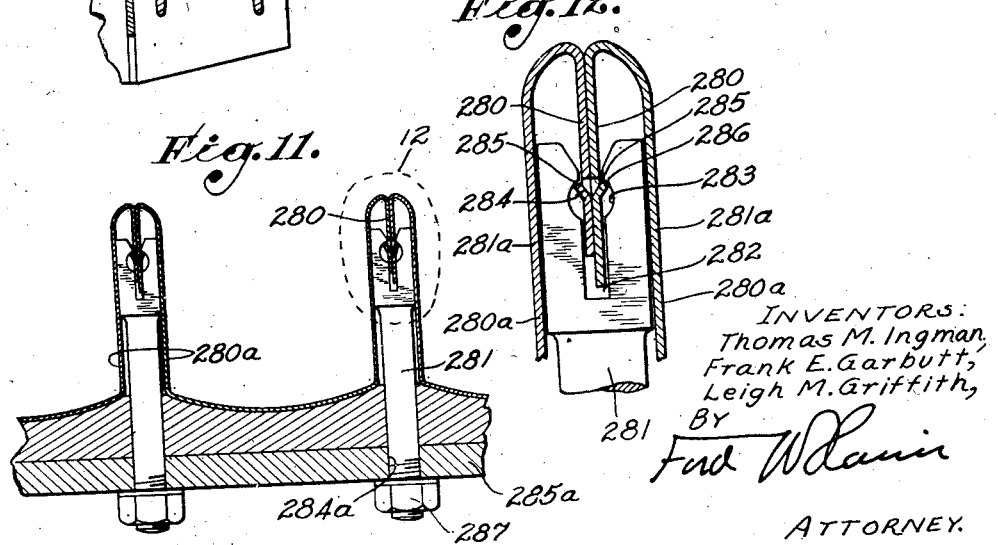

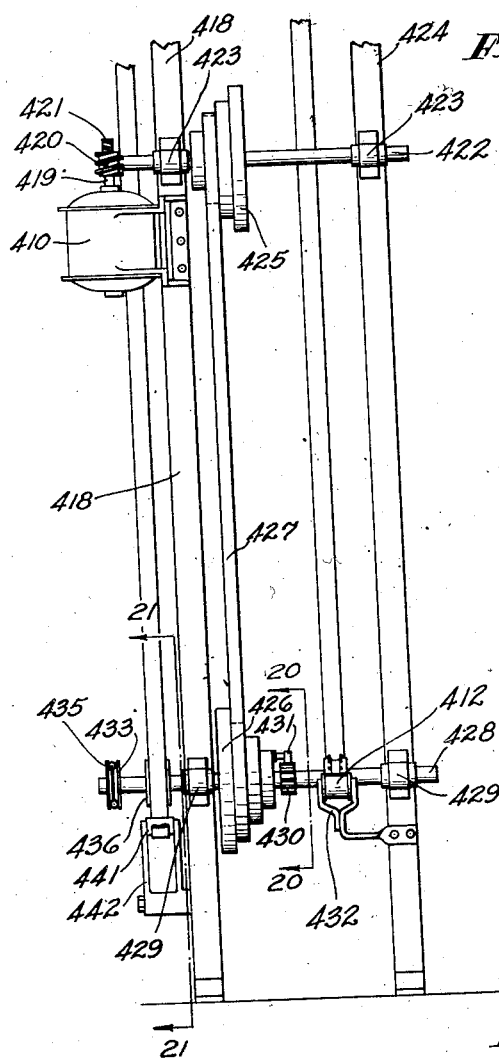
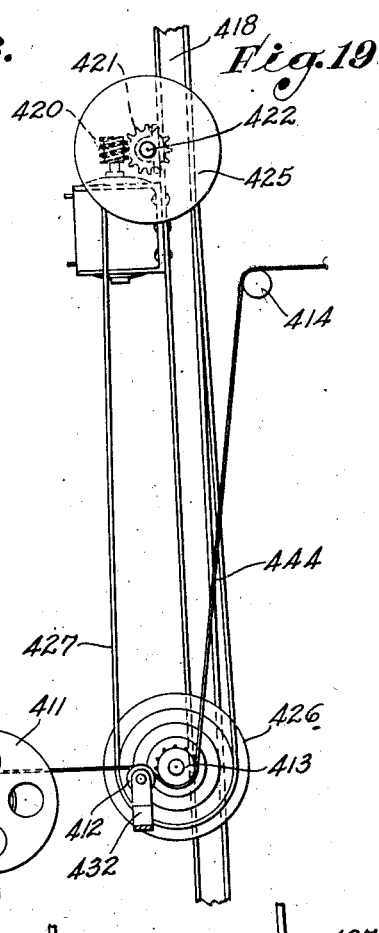
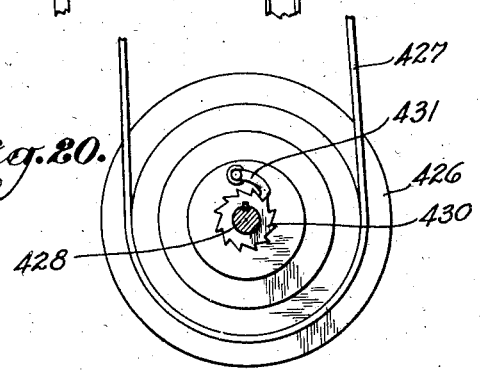
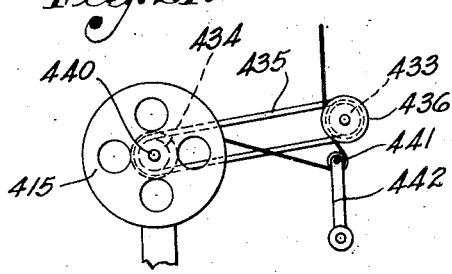

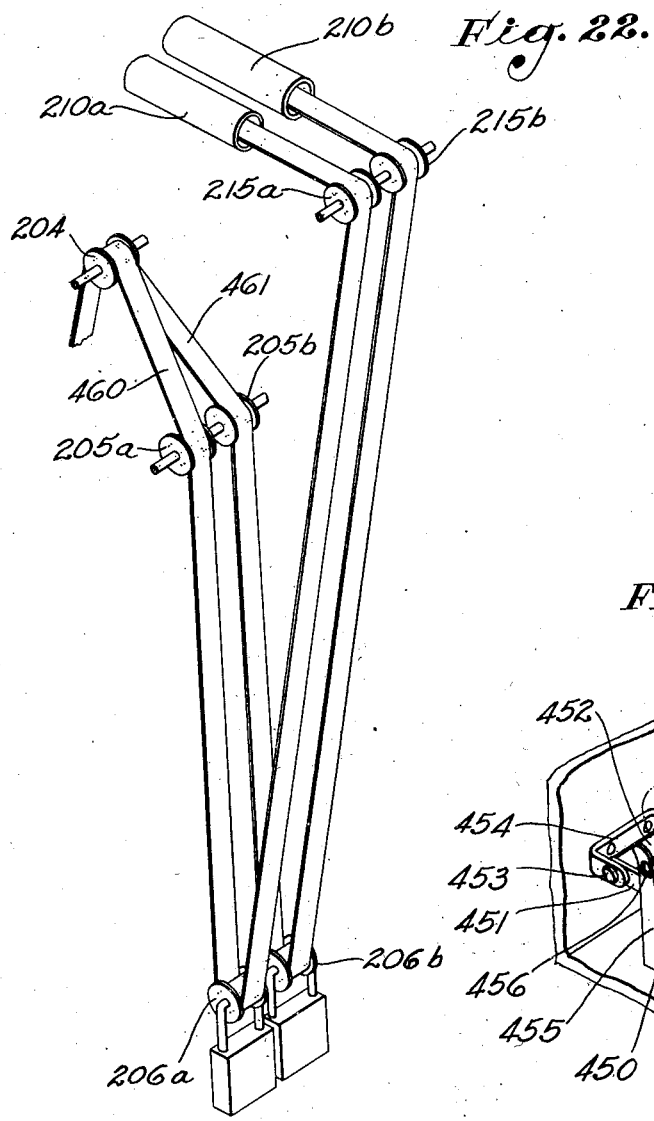

Patented Feb. 12, 1935

1,991,249

UNITED STATES PATENT OFFICE 1,991,249

PROCESS OF AND APPARATUS FOR DEVELOPING FILM

Thomas M. Ingman, Frank E. Garbutt, and Leigh M. Griffith, Los Angeles, Calif.

Application April 12, 1932, Serial No. 604,716

28 Claims. (Cl. 95—94)

This invention has general reference to the art of propelling long strips, such as motion picture film, through treating fluids. The present invention is designed particularly to meet in a simple but most effective manner the numerous problems encountered in developing, fixing, washing, and drying motion picture film, and is therefore spoken of hereinafter in reference in that connection, but it will be understood that the invention is also applicable to propulsion of film or other strips through other baths and treating apparatus as well, for example, coloring solutions.

In developing motion picture film, the film strip is ordinarily run in succession through the developing solution, the fixing solution, the water wash, and finally the dryer, the film strip being continuously supplied to the developing solution and being delivered continuously from the dryer. Parts of the same film strip are thus in solutions while other parts are passing through the dryer. The principal difficulty heretofore encountered in propelling the film through such solutions has arisen from the expansion of the film as it becomes wet, and the shrinkage of the film as it dries. Since one part of the film strip is undergoing wet treatment, and therefore expanding, while another part of the film is undergoing drying, and therefore shrinking, both elongation and shrinkage must be contended with in the same film strip.

The difficulties arising from said conditions and the attempts which have been made to obviate them are briefly referred to in an application entitled "Film developing system", Serial No. 489,600, filed October 18, 1930, by Ingman, Garbutt, and Barkelew.

The application just referred to discloses a method and apparatus for propelling a film through developing, fixing, and washing solutions by force arising from the flow of the solutions through the conduits containing them. The present invention is directed to an improved apparatus of the above character and to a process and apparatus for propelling a film strip through a gaseous bath by subjecting the film to the propulsive force arising from flowing the gas comprising the bath.

It is an object of the invention to provide a developing machine or film treating machine in which a pair of films may be handled in surface-to-surface engagement, thereby making it possible to treat two films where, and in the same space, a single film is now treated or developed in standard types of film handling apparatus. This is made possible in our invention by the fact that the movement of any film through the device after it leaves the inlet sprocket of the machine is controlled entirely by the speed of the inlet sprocket and the contraction and elongation of the film as it passes through the consecutive steps of the treatment to which it is subjected. As will be hereinafter fully explained, there are no sprockets within our machine for controlling the speed or movement of a film; therefore, after films are delivered into the machine at a controlled rate of movement by the inlet sprocket or sprockets, each film may elongate or contract independently, and each film will be kept taut by the propulsive action of the fluids. In the ordinary use of the invention a single film is carried through each channel or path of movement, but where it is desired to double the production capacity of a treating device such as is disclosed hereinafter by conducting a pair of films simultaneously in back-to-back arrangement through each of the channels or paths of movement, it may be desirable to separate the films of each pair when they arrive at the drying tubes, and conduct them through separate drying tubes instead of through a single drying tube. In the standard forms of film treating and developing apparatus now employed the varying rates of elongation and contraction of separate film strips make it impossible to conduct a pair of films in back-to-back relation through a single film treating channel or over a single series of supporting rollers or sprockets.

Various other objects and advantages of our invention will appear and be more fully understood from the following detailed description, reference being had to the accompanying drawings in which:

Fig. 1 is a diagrammatic elevation of a preferred form of apparatus embodying our invention.

Fig. 2 is an enlarged view of the film regulating mechanism shown in Fig. 1.

Fig. 3 is an enlarged view, partially sectioned, of the portion shown in the dotted enclosure 3 of Fig. 2.

Fig. 4 is an enlarged section of the adjustable positioning device for varying the length of the developing conduit through which the film passes.

Fig. 5 is a section taken on the line 5—5 of Fig. 4.

Fig. 6 is a section taken on the line 6—6 of Fig. 4.

Fig. 7 is an enlarged view of the portion shown in the dotted enclosure 7 of Fig. 1.

Fig. 8 is an enlarged view of the portion shown in the dotted enclosure 8 of Fig. 1.

Fig. 9 is a section taken on the line 9—9 of Fig. 8.

Fig. 10 is a section taken on the line 10—10 of Fig. 8.

Fig. 11 is an enlarged view of the conduit taken on the line 11—11 of Fig. 1.

Fig. 12 is an enlarged view of the portion shown in the dotted enclosure 12 of Fig. 11.

Fig. 13 is an enlarged view taken on the line 13—13 of Fig. 1.

Fig. 14 is an enlarged view taken on the line 14—14 of Fig. 1.

Fig. 15 is an enlarged view showing the manner in which the glass tubing is connected together to form conduits.

Fig. 16 is a view taken on the line 16—16 of Fig. 15.

Fig. 17 is an enlarged view of the portion shown in the dotted enclosure 17 of Fig. 1.

Fig. 18 is an elevational view showing an alternative form of film controlling mechanism which may be employed in the practice of the invention.

Fig. 19 is a side elevation corresponding to Fig. 18.

Fig. 20 is an enlarged cross-section on a plane represented by the line 20—20 of Fig. 18.

Fig. 21 is a section on a plane represented by the line 21—21 of Fig. 18.

Fig. 22 is a perspective view showing an alternative arrangement which may be employed in the area included within the dotted line 22—22 of Fig. 1.

Fig. 23 is a perspective view showing a simple manner in which the guide rollers of the film treating device may be movably mounted so as to release the tension on the film or leader strip to prevent injury thereto during the time the device is out of service.

Referring now to the drawings, and Figs. 1, 2, and 3 in particular, the numeral 10 indicates a film supply reel for a film 10a, 22 an entrance sprocket, 30 a weighted roller in a chamber 31, 40 a film feed or master sprocket, 100 a film positioning device, 120 and 121 film developing conduits, 140 and 141 fixing conduits, 160, 161, and 162 washing conduits, 210 a drying conduit, 250 a weighted roller, 255 a sprocket, and 260 a take-up reel.

As best shown in Fig. 2, the film supply reel 10 is mounted on a shaft 11. The shaft 11 is journalled in an arm 12 mounted on a shaft 13 on which a balancing weight 14 and a lever arm 15 are also mounted. A notch 16 in said balancing weight 14 is adapted to be engaged by a ball 17 which is mounted on a spring in support 18. The end of the lever arm 15 is connected to the lower arm of a brake rod 20 which extends upwardly along a support 24 and has its upper end 21 bent outwardly to form a right angle adjacent an entrance sprocket 22 which has a hub 23 and is mounted upon the support 24. Also mounted upon the support 24 are a spring 25 and a brake strip 26. The spring 25 is adapted to pass under the upper end 21 of the brake rod 20.

When the film supply reel 10 is in the position shown in Figs. 1, 2, and 3, the brake rod 20 is in its lowermost position, the spring 25 is compressed, and the end of the spring 25 contacts the brake strip 26 as shown in Fig. 3 and keeps it out of engagement with the hub 23, thereby allowing the sprocket 22 to rotate and the film to pass from the film supply reel 10 over the sprocket 22 into the chamber 31. The chamber 31 is located under the master sprocket 40 between the support 24 and a support 33.

In order to change the film supply reel 10, said reel is pulled down, as shown in Fig. 2, so that it rests on a rubber 27 which is provided for it on a table 28. When said supply reel 10 is pulled down, the shaft 11 and the lever arm 15 are rotated to the right, which allows the brake rod 20 to move upward under the action of the spring 25. The end of the spring 25 then no longer contacts the brake strip 26, thereby allowing said brake strip to contact the hub 23 of the sprocket 22, which prevents the sprocket from rotating and thereby stops the feed of the film to the chamber 31.

As soon as a new roll of film has been spliced to the end of the film already in the apparatus the film supply reel is returned to its uppermost position, thereby pulling the brake rod 20 down and forcing the end of the spring 25 into contact with the brake strip 26, and forcing the brake strip 26 out of contact with the hub 23.

The film is threaded from the supply reel 10 over the sprocket 22 under the weighted roller 30 and into engagement with the master sprocket 40. The weighted roller 30 is provided so that a source of film may be provided between the sprocket 22 and the master sprocket 40 which may be drawn upon when changing the film supply reel 10.

The weighted roller 30 is adapted to move up and down in the chamber 31 which is provided for it between supports 24 and 33. The roller is so weighted that it provides sufficient film tension to the film supply reel 10 to unwind the film from the supply reel 10 slightly faster than it is taken up by the master sprocket 40. The weighted roller 30 therefore normally rests on the bottom of the chamber when the film handling device is in operation and the brake strip 26 is held from contact with the hub 23. In this way a sufficient length of film is provided in the chamber 31 to allow ample time to change the film supply reel 10. When the sprocket 22 is kept from rotating, the master sprocket 40 draws the film from chamber 31 and the weighted roller 30 slowly rises in said chamber. When the film supply reel 10 has been changed, the films spliced together, and the film reel placed in feeding position, the weighted roller 30 again descends into chamber 31.

The film coming from the supply reel 10 and the film coming from the drying conduit 210 are adapted to engage opposite sides of the master sprocket 40. Said master sprocket 40 is driven by the film traveling into the developing machine as indicated at 39, and is mounted upon a shaft 41, the speed of the sprocket 40 being controlled by a suitable speed controlling device such as a constant-speed motor 42. As shown in Fig. 2, the constant-speed motor is provided with a gear box 43 and drives a shaft 44 and a shaft 45 at a constant rate of speed. The shaft 41 is provided with a pulley 46, and the shaft 44 with a pulley 47. The pulleys 46 and 47 are connected together by a belt 48. Pulleys 49 and 50 mounted on supports 33 and 24 respectively are provided to guide the belt 48 in its course around the pulleys 46 and 47.

As shown in detail in Fig. 3, the film coming from the weighted roller 30 is adapted to be kept in engagement with the teeth of the sprocket 40 by means of rollers 51 and 52 which are mounted on a bracket 53. The film coming from the conduit 210, as shown at 54a, is adapted to be kept in engagement with the teeth of the sprocket 40 by means of rollers 54 and 55 which are mounted on a bracket 56. Brackets 53 and 56 are mounted on shafts 57 and 58 respectively, and are connected together at their upper ends by means of a bar 59.

The master sprocket 40 is provided with a ratchet dog 60 which engages a ratchet 61 non-rotatably mounted on the constant-speed shaft 41, thereby preventing the sprocket 40 from rotating faster than a predetermined speed. The ratchet dog 60 is held in engagement with the ratchet 61 by means of a spring 62 which is mounted on the master sprocket 40 to the rear of the ratchet dog 60. It will be perceived that the sprocket 40 is not driven by the motor 42 but by the film, and that the motor 42 merely serves as a speed controlling means to limit the speed at which the film may enter the film treating device.

A button 65 is provided on the table 28. The button is connected to a rod 66, the other end of which is connected to one arm 67 of a bell crank 68, which is mounted on a shaft 69. The arm 70 of the bell crank 68 is connected to the lower end of a connecting rod 71, the upper end of which is connected to the rightward end of a double lever 72.

A button 75 is provided on a table 29. The button is connected to a rod 76, the other end of which is connected to one arm 77 of a bell crank 78 which is mounted on a shaft 79. The arm 80 of the bell crank 78 is connected to the lower end of a connecting rod 81. The upper end of the connecting rod 81 is connected to the leftward end of the double lever 72. The double lever 72 is pivoted on a shaft 82 which is directly below the driven shaft 41 and is provided with a projection 83.

When either button 65 or 75 is pushed inward, the connecting rods 71 and 81 and bell cranks 68 and 78 operate to rotate the double lever 72 in a clockwise direction, thereby causing the projection 83 to engage the outer end of the ratchet dog 60, thereby releasing the ratchet dog 60 from engagement with ratchet 61, compressing spring 62, and preventing the master sprocket 40 from rotating in forward direction. Pulling out button 65 or 75 reverses this action, forcing projection 83 out of engagement with the end of the ratchet dog 60, which allows the spring 62 to force the other end of the ratchet dog 60 into engagement with the ratchet 61.

As shown in Fig. 1, the film is threaded around the master sprocket 40 over a roller 86, under a roller 87, over slidable rollers 88, and into the trough-like conduit 120 by means of the positioning device 100. The slidable rollers 88 are mounted on standards 89 adapted to slide along the upper surface of the conduit 120 and to support the film at intervals before said film is guided into the conduit 120 by the positioning device 100.

The positioning device 100 is adapted to slide along the upper edge of conduit 120 and is adapted to vary the length of time during which the film is in the developing solution without changing the speed of travel of the film or the rate of flow of said developing solution. The positioning device 100 is constructed to allow the film to be placed in the conduit 120 at any desired point with a minimum of disturbance to either the film or the developing solution in said conduit. In other words, it is designed to allow the developing solution to pass around the edges and through the perforations of the film as the film is guided into said conduit, and thereby prevent the developing solution from piling up at the rear of the film.

As best shown in Figs. 4, 5, and 6, the positioning device 100 consists of an upper roller 101, and a lower roller 105. The upper roller 101 is mounted on a shaft 102 which is journalled in supports 103 and 104. The upper roller 101 is provided with flanges 111 and film treads 112 between which the rollers are undercut to clear the film, as at 113. Supports 103 and 104 are adapted to slide along the upper edges of conduit 120 and are guided by guide means 109 and 110 respectively to which they are attached by means of screws 114. The guide means 109 and 110 extend into the conduit 120 and are adapted to engage the sides of said conduit as diagrammatically indicated by the numeral 115, and are connected together by means of cross bars 116. The lower roller 105 is mounted on a shaft 106 which is journalled in members 107 and 108. The members 107 and 108 are connected to the supports 103 and 104 respectively by means of screws 117, and also assist in guiding the positioning device in the trough or conduit by engaging the side walls thereof.

The numeral 125 of Fig. 1 indicates a tank which is connected to a developer supply tank 122 by means of a pipe line 124, and a pump 123 is provided in the pipe line 124 to pump the developing solution to the tank 125. The conduit 120 slopes downwardly from the tank 125 and discharges into the upper part of a tank 126. Mounted in the tank 126 is a roller 127 and a guide 135. The guide 135 is adapted to guide the loose film around the roller 127 and thereby facilitate the initial threading and minimize the possibility of subsequent fouling. It also assists in directing the liquid around the roller 127 and minimizes the tendency of the liquid to form cross currents in the tank 126. The bottom portion of the conduit 120 extends into the tank 126 so that all of the liquid flowing through said conduit is forced around the roller 127. The guide 135 may conveniently be made of sheet metal.

The tank 126 discharges into the conduit 121 which slopes downwardly and discharges into the upper part of a tank 128. A pipe 129 leads from the bottom of the tank 128 to the developer tank 122 where the developing solution may be strengthened or renewed for further use. Mounted in the tank 128 is a roller 130, and guide wires 136 are also mounted in the tank 128. The guide wires 136 are adapted to guide the loose film and thereby facilitate the initial threading and minimize the possibility of subsequent fouling. They may be made of closely spaced strips or wire running in the same direction as the film, or of perforated metal.

The conduits 120 and 121 are of slightly greater width than the film. This permits an economy of developing solution and a very large percentage of said developing solution to be utilized to propel the film in said conduits.

The film is threaded under the roller 105 of the positioning device 100, through the conduit 120, around the roller 127, through the conduit 121, and under the roller 130 in the tank 128. The film rising from the roller 130, as shown in Fig. 7, passes between squeegees 132 which clean the film of the developing solution, over a roller 133, and then under a roller 142 in a tank 143 to enter the conduit 140.

Referring again to Fig. 1, the tank 143 is connected to a hypo supply tank 144 by means of a pipe line 145, and a pump 146 is provided in said pipe line to pump the hypo from the tank 144 through the pipe line 145 to the tank 143. The conduit 140 slopes downwardly from the tank 143 and discharges into a tank 147 which, as shown in Fig. 17, is provided with a roller 148 and discharges into the conduit 141. The conduit 141 slopes downwardly and discharges into the upper part of a tank 149 in the upper end of which tank 149 is a roller 150. A pipe 151 leads from the bottom of the tank 149 back to hypo tank 144 where the hypo solution may be strengthened or renewed for further use. The film is threaded through the conduit 140, around the roller 148, through the conduit 141, and under the roller 150. The film rising from the roller 150 passes between squeegees 152 which clean the film of the fixing solution, passes over a roller 153, and then under a roller 170 in a tank 175 to enter the conduit 160.

The film is washed in conduits 160, 161, and 162, which are operated independently of each other in a semi-counter-flow arrangement. We prefer to have the film washed with the water containing the least impurities just before the film enters the drying conduit 210. This results in an economy of water and insures a thorough washing of the film.

The numerals 164, 165, and 166 indicate water supply tanks. Fresh water is supplied to the tank 164 by means of a pipe 167 which is provided with a valve 168. An overflow pipe 170 leads from the tank 164 to the tank 165. An overflow pipe 171 leads from the tank 165 to the tank 166. When fresh water is supplied to the tank 164 by means of the pipe 167, after the tank 164 is filled to the level of the overflow pipe 170, water passes through the overflow pipe 170 to the tank 165. After the tank 165 is filled to the level of the overflow pipe 171, water passes from the tank 165 through the overflow pipe 171 to the tank 166. After the tank 166 is filled, water passes from the tank 166 into an overflow pipe 172 which disposes of it.

A tank 175 is connected to the tank 166 by means of a pipe line 176, and a pump 177 is provided in said pipe line to pump water from the tank 166 through the pipe line 176 to the tank 175. The tank 175 discharges into the conduit 160, which slopes downwardly and discharges into a tank 178. The tank 178 is provided with a roller 179. A pipe 180 leads from the bottom of the tank 178 back to the tank 166. The film is threaded through the conduit 160, under the roller 179, over a fixed roller 181, and under a roller 182 in a tank 185 into the conduit 161.

The tank 185 is connected to the tank 165 by means of a pipe line 186 and a pump 187 is provided in said pipe line to pump water from the tank 165 through the pipe line 186 to the tank 185. The tank 185 discharges into the conduit 161, which conduit slopes downwardly and discharges into a tank 188. The tank 188 is provided with a roller 189. A pipe 190 leads from the bottom of the tank 188 to the tank 165. The film is threaded through the conduit 161, under the roller 189, over a fixed roller 191, and under a roller 192 in a tank 195 into the conduit 162.

The tank 195 is connected to the tank 164 by means of a pipe line 196, and a pump 197 is provided in said pipe line to pump water from the tank 164 through the pipe line 196 to the tank 195. The tank 195 discharges into the conduit 162, which conduit slopes downwardly and discharges into a tank 198. The tank 198 is provided with a roller 199. A pipe line 200 leads from the bottom of the tank 198 to the tank 164. The film is threaded through the conduit 162, under the roller 199, up through squeegees 203 which are similar to squeegees 132 and 152 and which remove the water from the film, over guide rollers 204 and 205, and under a weighted roller 206.

After the process has been started, instead of adding additional fresh water from the pipe line 167 to the tank 164, we prefer to add it to the tank 195 from a water pipe line 201 having a valve 202. In a modification of our process we may add the fresh water to our system by spraying it in a fine spray on both sides of the film as the film leaves tank 198.

As previously mentioned, one part of the film strip is passing through solutions and therefore expanding, while another part is being dried and therefore contracting, and both elongation and shrinkage must be contended with in the same film strip. The weighted roller 206 is adapted to compensate for these phenomena and to keep the film in the apparatus under a constant tension.

The film is introduced into the conduit 210 through a film passageway 211 formed in a housing 212, as shown to enlarged scale in Fig. 8, between a wall 213 and a film roller 215. Obviously the film passageway 211 must be large enough to allow for all splices and patchwork to pass therethrough without damage to the film.

The roller 215 is mounted on a shaft 214 and is held in tension between supports 216 and 217 by means of a spring 218. The roller is provided with flanges 219 and film treads 220 between which the roller surface is undercut as at 221. An air passageway 222 in the housing 212 is gradually constricted as shown in Fig. 8 to provide a nozzle for directing the drying gas between the flanges 219 of the roller 215 and into a hollow fitting 230 which gradually expands and communicates with the conduit 210. Air pockets 223 are provided in the wall 213 which assist in keeping the loss of gas at a minimum. A gate valve 224 is provided and is adapted to stop the flow of gas in the passageway 222. The gate valve 224 is adapted to be held in raised position when not in use to close the passageway 222 by means of a spring 225. The air passageway 222 may be inspected by removing a spring 226 from contact with a cover member 227, which member 227 comprises part of the top of the housing 212. The spring 225 is riveted to the lower end of the member 227. The cover member 227 is provided with a finger piece 228 and as the member 227 is removed, the spring 225 no longer contacts the gate valve 224 and allows the gate valve to drop down into a position closing the air passageway 222.

As shown in Fig. 1, the leftward end of the conduit 210 communicates through a tapered fitting 231 with a film passageway 235 which is provided in a housing 236. Mounted in the housing 236 is a roller 237 which is similar to roller 215. In the walls lying adjacent the roller are labyrinth air pockets (not shown) which are designed to allow the film to leave the housing 236 through an opening at 238 with a minimum loss of gas.

Although we can use, heated, but otherwise untreated, air from the atmosphere, we prefer to treat the air so that its moisture content is less than 15 grains per pound of air. We have found that air having a low moisture content quickly absorbs moisture from the film and dries the film in a minimum of time. We prefer to reduce the moisture content of the air by refrigeration, and therefore pass air that has been used, or air from the atmosphere, through a spray type dehumidifier 240 and then over brine coils 241. In using air from the atmosphere we first pass it through a viscous filter 239. From the coils 241 the air passes through a pump 242, which pumps the air over a steam coil heater 243, or through a by-pass 244 if the temperature of the air is sufficient to dry the film, and then to a pipe line 245 which communicates with the air passageway 222. For the re-use of air, a pipe line 246 leads from the housing 236 to the dehumidifier 240.

The treated air is passed through the air passageway 222 at such a rate, and the air passageway 222 is so constructed that the pressure in the air passageway 222 is gradually reduced so that the pressure at the point where the film passes over the roller 215 is slightly above atmospheric. The ideal condition is one in which air neither passes into nor out of the film passageway 211. However, in order to be sure that no air passes into the air passageway 222, we prefer to maintain the pressure in the most constricted portion of the air passageway 222 above atmospheric. The conduit 210 is gradually enlarged after it leaves the air passageway 222 in order to gradually reduce the velocity of the air, which tends to minimize turbulence in the conduit, which in turn tends to minimize film flutter. The velocity in the conduit 210 is approximately one-fifth of that in the most constricted portion of the passageway 222. The connection between the air passageway 222 and the conduit 210 is so designed that the film passes on a straight line after it passes over the roller 215, even though it passes from the rectangular air passageway 222 into the circular conduit 210. The film is propelled in the lower portion of the conduit 210 so that most of the air is above the film and is utilized to dry said film.

As shown in Fig. 1, the film leaving the drier conduit 210 passes around a film roller 247 to the master sprocket 40. As shown in Fig. 2, a weighted roller 250 is provided so that the film may be held between the master sprocket 40 and the sprocket 255 in the chamber 31 in taut condition while the film take-up reel 260 is being changed. The weighted roller is adapted to move up and down in the chamber 31. The film coming from under the fixed roller 247 passes across the master sprocket 40, under the weighted roller 250 in the chamber 31, over the sprocket 255, and is wound on the film take-up reel 260. As previously mentioned, rollers 54 and 55 are provided in order to keep the treated film in contact with the master sprocket 40. The sprocket 255 is mounted upon the support 33 and is provided with a ratchet brake strip 257. The ratchet brake strip 257 is adapted to contact the hub 256 of the sprocket 255, and thereby prevent the sprocket 255 from rotating in a clockwise direction.

The film take-up reel 260 is mounted upon a shaft 261 which is journalled in a lever arm 262, mounted on a shaft 263 on which a balancing weight 264 is also mounted. A notch 265 in said balancing weight 264 is adapted to be engaged by a ball 266 which is mounted on a spring in a support 267. The film take-up reel 260 is adapted to be rotated by a friction pulley 268, which is mounted on a shaft 269. The shaft 269 is journalled in a member 270 which is secured to the support 33. A pulley 271 is also mounted upon the shaft 269, which pulley is connected by means of a belt 274 to a pulley 272 mounted on the shaft 45. The driven take-up reel 260 is adapted to draw the film from the master sprocket 40, under the weighted roller 250, over sprocket 255, and wind the film upon itself.

When it is desired to change the take-up reel, said reel is drawn to the position shown in dotted lines in Fig. 2, when it rests upon the rubber pad 275 on the table 29. When the reel is out of engagement with the friction pulley 268, the sprocket 255 is held from rotation in reverse direction by the brake strip 257 which serves as a ratchet and the film is held taut between sprockets 40 and 255 by means of the weighted roller 250, and as film continues to enter the chamber 31 from the master sprocket 40, the weighted roller descends in the chamber 31. When the take-up reel 260 has been changed, it is again moved into contact with the friction pulley 268, which provides sufficient film tension to rotate the take-up reel 260 at a rate which winds the film at a rate which is slightly greater than the rate at which it is sprocketed by the master sprocket 40, and thereby causes the weighted roller 250 to rise in the chamber 31 to its normal operating position against a stop bar 250a.

The drier conduit 210 is preferably made of tubes 350, joined together as shown in Figs. 15 and 16, and coupled to the fittings 230 and 231 by means of coupling devices 351. The tubes 350 are preferably of glass so that the film passing therethrough may be viewed and the ends 352 thereof are flared as shown in Fig. 15 so as to eliminate sharp corners which might injure the film passing therethrough. On the ends of the members 351, 230, and 231, sealing rings 355 are placed. These sealing rings are preferably made from a resilient material, such as rubber, and are provided with cylindrical external faces 356 of slightly larger diameter than the interior of the coupling members 351 which are each comprised of a pair of cooperating semi-cylindrical halves 357, as shown in Fig. 16, joined together by bolts 358 which pass through lugs 359 extending from the edges of the members 357. Under ordinary circumstances it is difficult to obtain accurate diameters in glass tubes of such large diameter as required herein; therefore, by use of the sealing means 355 mounted on the ends of the glass tubes 350, we are enabled to employ inaccurately gaged glass tubes such as are now obtainable on the market.

In Fig. 15 we have shown the manner in which the adjacent ends of tubes 350 are joined together by a coupling device 351, and in Fig. 8 we show the manner in which the same coupling device 351 is employed to secure the end of the glass tube 350 to an air fitting, such as the fitting 230 or the fitting 231. In each use of the coupling 351 the annular resilient sealing members are employed on the ends of the parts to be thereby connected. It is to be understood that the conduit 210 is to be suitably supported throughout its length, either by members engaging the glass tubes 350 or by members engaging the couplings 351.

The sectional views Figs. 13 and 14 show positions of the film as it passes through the drier conduit 210 of the film treating device. In Fig. 13 we show a portion 361 of the film slightly curled due to the presence of moisture in the emulsion on the upper face thereof. Due to being wet, the film entering the rightward end of the drier conduit 210 is ordinarily curled or convexed in this manner, but as the film continues through the drier conduit toward the leftward end thereof, the moisture content is extracted by the drying gas or air, and under normal conditions the film, due to such drying, will flatten out. Accordingly we have in Fig. 14 shown a portion 362 of the film in substantially flat condition. It will be noted that regardless of whether the film is curved or flat, only the edges 363 thereof engage the wall of the glass tube 350 from which the drier conduit 210 is formed, with the result that there is no possibility of injuring the emulsion carried on the film during its passage through the drying steps of the process. Although we have shown the glass tubes used only in the drier section of the developing machine, they may be also used to good advantage in place of the trough-like conduits employed in the wet stages of the machine.

Having described a form of our invention and the manner in which the film is threaded, we shall describe the operation of the apparatus.

A leader, preferably of uncoated film, is usually used to thread the apparatus and the film to be treated is attached to this leader. The leader is attached to the last film treated and left in the apparatus.

The pumps 123, 146, 177, 187, and 197 are started. The pump 123 pumps the developing solution from the tank 122 through the pipe line 124 to the tank 125. The solution flows downwardly through the conduit 120 to the tank 126, and from the tank 126 downwardly through the conduit 121 to the tank 128, and is returned to the tank 122 by means of the pipe 129.

The motor 42 is then started so as to permit the master sprocket 40 to turn, and the flowing liquids in the conduits 120 and 121 advance the film by the force of the skin friction between the liquid and the film, drawing the film from the master sprocket 40, over the fixed roller 86, under the fixed roller 87, over the slidable rollers 88, over the upper roller 101 and the lower roller 105 of the positioning device 100, and through the conduits 120 and 121, discharging said film in the tank 128. The film floats around the roller 127 in the tank 126 out of actual contact with the film treads of said roller, but does not contact the walls of said tank.

The pull on the film through the conduits 120 and 121 is due to the viscous drag of the liquid flowing through said conduits, and is dependent in amount upon the velocity of flow of the liquid in said conduits. This velocity of flow is dependent in part upon the difference in elevation between the ingoing and outgoing ends of the conduits. The various velocity factors are so calculated that the resultant velocity of liquid flow will tend to propel the film through the conduits considerably faster than the speed permitted by the master sprocket 40, thus giving the conditions of frictional overdrive and preventing the development of slack in the apparatus. The master sprocket 40 thus acts as a hold-back or speed controlling means for the film, but not as a motivating means for the film. However, the liquid should not be flowed through the conduits at such rate that the film will be pulled too strongly against the rollers at the turns of the conduits, or will be pulled too strongly against the master sprocket 40.

The velocity of film movement through the apparatus is determined by the master sprocket 40. Uniform development is absolutely dependent upon maintaining the desired uniform velocity of the film through the developing solution. If the film should run off the master sprocket 40, the film movement through the apparatus would be materially and irregularly accelerated. The film in and preceding the developer would be spoiled, and the apparatus would have to be rethreaded.

The film itself is carried at approximately the center of the flowing stream, being returned to this position by dynamic forces within the stream itself following any displacement therefrom. This centering is automatic and inherent and insures that the film itself does not contact with the conduit bottom. This method of supporting and moving the film greatly minimizes the risk of mechanical damage to the film, as compared to the usual means involving sprockets or frictional driving spools.

The pump 146 pumps the fixing solution from the tank 144 through the pipe line 145 to the tank 143. The solution flows from the tank 143 downwardly through the conduit 140 to the tank 147, and from the tank 147 downwardly through the conduit 141 to the tank 149, from which it is returned to the tank 144 through the pipe 151.

The propulsive force of the fixing solution flowing through the conduits 140 and 141 causes the film to be moved from the tank 128 up through the squeegees 132 which remove the developing solution from the film, over the fixed roller 133, under the roller 142, through the conduit 140, around the roller 148, through the conduit 141, and discharges said film into the tank 149.

The pump 177 pumps water from the tank 166, through the pipe line 176, to the tank 175. The water flows downwardly from the tank 175, through the conduit 160, to the tank 178. The water is returned to the tank 164 from the tank 178 by means of the pipe 180. The pump 187 pumps water from the tank, through the pipe line 186, to the tank 185. The water flows downwardly from the tank 185, through the conduit 161, to the tank 188. The water is returned from the tank 188 to the tank 165 by means of the pipe 190. The pump 197 pumps water from the tank 164, through the pipe line 196, to the tank 195. The water flows from the tank 195, downwardly through the conduit 162, to the tank 198. The water is returned from the tank 198 to the tank 164 by means of the pipe line 200.

The propulsive force of the wash water flowing through the conduits 160, 161, and 162 causes the film to be moved from the tank 149 up through the squeegees 152 which remove the fixing solution from the film, over the roller 53, under the roller 170, through the conduit 60, under the roller 179, over the roller 181, under the roller 182, through the conduit 161, under the roller 189, over the roller 191, under the roller 192, through the conduit 162, under the roller 199, up through the squeegees 203, and over the rollers 204 and 205.

The liquids in the conduits 140, 141, 160, 161, and 162 are flowed through said conduits with sufficient velocity so that the liquid will tend to propel the film through the conduits at a speed considerably faster than that permitted by the master sprocket 40, thus giving the conditions of frictional overdrive so that the film will be kept moving in taut condition. However, the liquids should not be flowed through the conduits at such a rate that the film will be pulled too strongly against the master sprocket 40 or will be pulled too strongly against the rollers at the ends of the conduits.

In the developing and fixing channels the velocity difference (relative velocity) need be sufficient only to insure the uniform action of the solutions upon the emulsion, while in the washing conduits the velocity differences must be sufficient to approximate the ideal washing condition. The ideal velocity is that which is just sufficient to insure removal of the closely adhering layer of relatively highly concentrated solution from the emulsion surface as fast as this layer is formed by diffusion from the emulsion. Higher velocities do not appreciably increase the washing rate, but lower velocities distinctly reduce it.

Meanwhile, the dehumidifier 240, the cooler 241, the pump 242, and the heater 243 are started. The pump 242 pumps the air through the heater 243 or through the by-pass 244, through the pipe 245, to the passageway 222 in the housing 212, which passageway 222 communicates with the drying conduit 210. The other end of the conduit 210 communicates with the housing 236. The housing 236 communicates with the pipe 246 which is adapted to return the air from the housing 236 to the dehumidifier 240.

The propulsive force of the gas flowing through the conduit 210 causes the film to be moved around the weighted roller 206, up through the opening or film passageway 211, over the roller 215, through the conduit 210, and over the roller 237 in the film passageway 235. The gas is flowed through said conduit 210 at such a rate that the film will be dried before it reaches the end of said conduit, and at such a rate that the film will be kept moving in a taut condition until it passes out of the opening 238.

The moisture content of the different films as they enter the opening 211 varies within certain limits. Ordinarily we prefer to condition the drying air and flow the drying air through the conduit 210 at such a rate that the film will be dried by the time it passes through four-fifths of the length of said conduit.

The film is propelled in the lower portion of the conduit and, as shown in Fig. 13, is curved downward from its center portion due to the moisture content of the emulsion on the upper side thereof. As the film is propelled through the conduit, the emulsion loses most of its moisture content so that the film is straightened out as shown in Fig. 14. However, the film still rides in the lower portion of the conduit.

We prefer to lower the moisture content of the drying air in the dehumidifier 240 and the brine cooler 241 so that the moisture content of the drying air is not more than 15 grains per pound of air. Although we can obtain quicker drying of the film in the conduit 210 by using air having a lower moisture content, we find it more economical and obtain perfect drying by varying the temperature of the drying air and the rate of flow of said drying air in the conduit 210.

The air is warm and dry as it enters the air passageway 222, but is cool and moist when it leaves the conduit 210, the progressive evaporation of the water from the film lowering the temperature and at the same time increasing the moisture content. If the condition of the entering air and the velocity of flow past the film in the conduit 210 are correct, the atmosphere surrounding the film immediately preceding its exit from the conduit 210 is maintained at the correct humidity to insure the most satisfactory condition of the dried film.

Normally air will be drawn into the dehumidifier 240 from the open air through a dry filter, rather than to condition the air that has been used to dry the film over again. This is because the air leaving the conduit 210 will be of higher than atmospheric humidity, and the most expensive operation in the conditioning of the drying air is that of reducing the moisture content. Only on days of exceptional high humidity, i. e., when the humidity of the atmosphere is higher than that of the air coming from the conduit 210, will the latter air be recirculated.

As we have already stated, our invention discloses in conjunction with a developing process having many features of novelty, a process of propelling a film strip through the drying treatment by means of the propulsive force of the drying gas, and although we have described its use in connection with a process in which the film is propelled through developing, fixing, and washing solutions by force arising from the flow of the liquids comprising said solutions, it is obvious that our process of drying the film can be used regardless of the process and apparatus used to develop, fix, or wash the film.

In Fig. 1 we have diagrammatically shown a single complete developing machine including a drier. It is intended that a plurality of such machines be installed in side-by-side relationship, each receiving a separate length of film and working independent of the remaining machines. These machines, due to their simple construction, may be placed in very close working relationship, and it is a part of the invention to provide means for connecting and securing the conduit or trough members in side-by-side relationship in a minimum of space.

A special and valuable feature of our invention resides in the following: In Fig. 1 the film is shown leaving the speed control sprocket 40 as indicated at 39, from there passing through the various wet stages of the device, and finally returning to the sprocket 40 from the outlet end of the drying conduit 210 as indicated at 54a. Were the film cut adjacent the sprocket 40 and the parts 39 and 54a joined together, a continuous or closed loop would be formed extending through the developing machine, and by turning on the various fluids or flows in the conduits, this required currents or flows would be caused to continuously loop of film would be caused to continuously travel. In a like manner the control sprocket 40 joins the portions 39 and 54a of the film together so as to form in the developing machine a loop of a definite number of film frames, for as fast as film is added to the loop by the rightward side of the sprocket 40, an equal amount is taken from the loop by the leftward side of the sprocket 40. Shrinkage and elongation of the film within the developing machine are compensated for by movement of the weighted roller 206 which preserves a desired tension in the film to prevent flopping or buckling. As previously explained, the sprocket 40 is not driven by power devices but, being connected to a motor through ratchet means, this sprocket cannot rotate above a prescribed speed and therefore controls the speed of travel of the film through the developing machine.

Two or more conduits may be connected together as shown in Figs. 11 and 12. The edges 280 of conduits 280a are outwardly and then downwardly bent parallel to the sides 281a of the conduits, and said edges placed together. A bolt 281 is provided, the upper end of which is flat and has therein a vertical slot 282 and a circular opening 283. The edges 280 have tongues 284 punched therefrom at points opposite the upper edges of the circular openings 283 of the bolts 281 to provide abutments 286 to engage the points 285 formed at the upper portions of the holes 283. The bolts 281 are then inserted through holes 284a in horizontal supporting arms 285a so that the edges 280 extend into the vertical slot 282. The abutments 286 are then brought into positions in the circular openings 283 of the bolts 281. Nuts 287 are then threaded onto the lower ends of the bolts 281 and tightened in the well known manner, thereby drawing the conduits tightly down against the supporting arm 285a.

A modification of our film driving mechanism is shown in Figs. 18 to 21 in which the numeral 410 indicates a motor, 411 a film supply reel, 412 and 414 film guide rollers, 413 a control sprocket, and 415 a take-up reel.

The motor 410 is mounted upon a support 418 and is adapted to drive a shaft 419, upon which a worm gear 420 is mounted. The worm gear 420 is adapted to engage a gear 421 which is non-rotatably mounted upon a shaft 422. The shaft 422 is journaled in bearings 423, which in turn are mounted upon supports 418 and 424. Secured upon the shaft 422 is a cone pulley 425 adapted to drive another cone pulley 426 by means of a belt 427. The cone pulley 426 is freely turnable upon a shaft 428 journaled in bearings 429 which are mounted upon the lower portions of the supports 418 and 424. A ratchet 430 is non-rotatably mounted upon the shaft 428. The teeth of the ratchet are adapted to be engaged by a pawl 431 which is secured to the cone pulley 426 and thereby prevent the shaft 428 from rotating at a rate of speed greater than the speed of the pulley 426. The roller 412 is mounted upon the support 424 by means of a bracket 432 and is adapted to hold the film in close engagement with a control sprocket 413 which is fixed on the shaft 428. Mounted on the leftward end of the shaft 428 is a pulley or sheave 433 which is connected as shown in Fig. 21 to a pulley 434 by means of a belt 435. The pulley 434 is mounted upon a shaft 440 adapted to receive the take-up reel 415.

Secured on the shaft 428 adjacent the pulley 433 is a sprocket 436 which is similar to and the same size as the feed sprocket 413. A guide roller 441 is mounted upon the support 418 by means of a bracket 442 and is adapted to maintain a film in close engagement with the sprocket 436. The sprocket 436 is therefore rotated by and at the same rate of speed as the feed sprocket 413.

The film take-up reel being mounted upon a shaft 428, is rotated by friction of slipping members of any type commonly employed for this purpose. The belt 435 may slip on the pulleys 433 and 434 or the pulleys 433 and 435, or the reel 415 may be mounted so as to slip on their respective shafts.

As shown in Fig. 19, a film is extended over the roller 412, under the sprocket 413, and then up over the guide roller 414, as indicated at 444, from which it passes to the supporting rollers 88 at the entering end of the developing machine shown in Fig. 1. The film coming from the air conduit 210 is threaded over the spool 237, out of the opening 238, in contact with the sprocket 436, under the fixed roller 441, and onto the film take-up reel 415.

The operation of this modification is similar to that of the main film regulating mechanism and therefore need not be described in detail.

Throughout the film-developing device shown in Fig. 1, guide rollers for a film have been employed. It is a purpose of the invention to provide a means for releasing the tension on a film or leader strip within the device, when desired. To accomplish this a selected number of film guide rollers are movably mounted and provided with releasable latch means so that they may be released and moved into positions materially shortening the path through which the film is conducted in the device.

For the purpose above set forth, rollers 130, 142, 150, 170, 179, 182, 189, 192, and 199 may be releasably mounted as shown in Fig. 23. Owing to the diagrammatic nature of Fig. 1, other figures in the drawings have been employed to show details of construction and it is to be acknowledged that these details of construction form a part of the device disclosed schematically in Fig. 1. To illustrate the manner in which selective guide rollers may be movably mounted, we have in Fig. 23 shown the roller 189 rotatably mounted in a double-armed lever member 450 consisting of a pair of arms 451 extending from a sleeve 452 which is pivoted on a shaft 453 carried by a bracket 454. The bracket 454 and a spring latch member 455 are secured to the tank 188, and the latch member 455 is so formed and positioned that it will hold the lever member 450 in substantially horizontal or rightwardly and downwardly sloping position. The latch member 455 may be manually actuated to release the catch 456 thereof from engagement with one of the arms 451, whereupon the lever member 450 may swing upwardly into the position shown by dotted lines 457, shortening the path through which the film 10a must travel during a film treating operation and thereby releasing the tension in the film or leader strip so that shrinkage thereof due to drying or other causes during the time the device is not in operation, will not result in injury to the film or leader strip.

As previously set forth herein, the device disclosed in Fig. 1 may have its capacity doubled by providing a pair of film supply reels instead of a single film supply reel shown at 10 in Fig. 1. From this pair of reels a pair of films to be treated may be conducted in back-to-back relationship across the various sprockets, and guide rollers, and through the treating troughs or channels of the device; or, as an alternative, the pair of films to be treated may be wound together on a single film supply reel, in back-to-back position. It may be desired to duplicate the drying unit or drying conduit 210 of Fig. 1 as diagrammatically indicated by the tubes 210a and 210b shown in Fig. 22, and also to duplicate the parts associated therewith. Accordingly, in Fig. 22 we have shown rollers 215a and 215b at the entering ends of the tubes 210a and 210b. When the pair of films 460 and 461 leaves the guide roller 204 of the device shown in Fig. 1, the films may be divided or separated and carried over separate guide rollers 205a and 205b mounted in side-by-side position on the axis of the roller 205 of Fig. 1, and the films 460 and 461 may be equipped with a pair of weighted rollers 206a and 206b to provide an individual takeup for each film 460 or 461. We believe that the above discussed feature of conducting a pair of films in face-to-face or back-to-back position through a single course or path of the device is of considerable importance, and it may be here remarked that we know of no film-treating device now in use which may be increased in capacity in this simple manner. We believe it to be customary practice to increase the film treating capacity of a machine by adding complete new units thereto, this requiring an increase in space occupied by the device in proportion to the number of treating units added.

Although we have described our invention with respect to certain particular embodiments thereof, nevertheless we do not desire to be limited to the particular details shown and described, except as clearly specified in the appended claims, since many changes, modifications, and substitutions may be made without departing from our invention in its broader aspects, and our invention in its broader aspects may be found useful in many other applications thereof.

We claim as our invention:

1. A method of treating a film, comprising feeding the film to an established path of movement at a substantially constant rate of speed, and producing forward flows of developing, fixing, washing, and drying fluids through consecutive portions of said path of movement in contact with said film and at such rates of flow that said film will be moved through said path of movement by said flowing fluids.

2. A method of treating a film, comprising feeding the film to an established path of movement at a substantially constant rate of speed, and producing forward flows of developing, fixing, washing, and drying fluids through consecutive portions of said path of movement in contact with said film and at such rates of flow that said film will be moved through said path of movement by said flowing fluids, said rates of flow of said fluids being proportioned in a manner to keep the film in taut condition throughout the length of said path of movement.

3. A method of treating a film, comprising feeding the film to an established path of movement at a substantially constant rate of speed, and producing forward flows of developing, fixing, washing, and drying fluids through consecutive portions of said path of movement in contact with said film and at such rates of flow that said film will be moved through said path of movement by said flowing fluids, said rates of flow of said fluids being such as to transmit greater motivating force to said film than is required to move said film through said path of movement.

4. A method of propelling a film strip, which comprises mechanically guiding only the edges of said film strip and producing a flow of gas along and in contact with said film.

5. A method of propelling and drying a film strip, which comprises: feeding a film into a path of movement; mechanically guiding only the edges of said film; and producing a flow of gas above and below said film in said path of movement to move said film forwardly and remove the moisture content therefrom.

6. A method of propelling and drying a film strip, which comprises: feeding a film into a path of movement; guiding the edges of said film in said path of movement by walls disposed diagonally with respect to the plane defined by the width of said film; and producing a flow of gas above and below said film in said path of movement to move said film forwardly and remove the moisture content therefrom.

7. A method of treating a film strip, comprising: extending the film strip through a path of movement; guiding the film strip at the ends of said path of movement so as to prevent rotation in a plane normal to the path of movement; mechanically exerting tension in said film strip; and producing a flow of treating fluid along said path of movement and in contact with said film.

8. A method of treating a film strip, comprising: extending the film strip through a path of movement; guiding the film strip at the ends of said path of movement so as to prevent rotation in a plane normal to the path of movement; mechanically exerting tension intermediate the ends of said film strip; and producing a flow of treating fluid along said path of movement and in contact with said film.

9. A film treating apparatus of the character described, including: members providing a path of movement for a film; means for producing a flow of treating fluid along said path of movement and in engagement with said film to treat said film and propel the same through said path of movement; and means at the entering end of said path of movement functioning only to limit the speed at which the film may be drawn into said path of movement, the speed of flow of said treating fluid being greater than the speed of movement of said film whereby to produce a constant tension in said film tending to move said film faster than said limiting means.

10. A film treating apparatus of the character described, including: members providing a path of movement for a film; means for producing a flow of treating fluid along said path of movement and in engagement with said film to treat said film and propel the same through said path of movement; and means at the entering end of said path of movement for limiting the speed at which the film may be drawn into said path of movement, said limiting means comprising a sprocket engaging said film and a rotatable member movable at a controlled speed, with means connecting said sprocket and said rotatable member in such a manner that said sprocket can not be rotated faster than said rotatable member.

11. A film treating apparatus of the character described, including: members providing a path of movement for a film; means for producing a flow of treating fluid along said path of movement and in engagement with said film to treat said film and propel the same through said path of movement; means at the entering end of said path of movement for limiting the speed at which the film may be drawn into said path of movement, said limiting means comprising a sprocket engaging said film and a rotatable member movable at a controlled speed, with means connecting said sprocket and said rotatable member in such a manner that said sprocket can not be rotated faster than said rotatable member; and sprocket means connected to said sprocket so as to rotate in synchronism therewith, said sprocket means engaging said film at the exit end of said path of movement.

12. A film treating apparatus of the character described, including: members providing a path of movement for a film; means for producing a flow of treating fluid along said path of movement and in engagement with said film to treat said film and propel the same through said path of movement; means at the entering end of said path of movement for limiting the speed at which the film may be drawn into said path of movement, said limiting means comprising a sprocket engaging said film and a rotatable member movable at a controlled speed, with means connecting said sprocket and said rotatable member in such a manner that said sprocket cannot be rotated faster than said rotatable member; sprocket means connected to said sprocket so as to rotate in synchronism therewith, said sprocket means engaging said film at the exit end of said path of movement; and means between said sprocket and said sprocket means for producing a positive tension in said film.

13. A film treating apparatus of the character described, including: members providing a path of movement for a film; means for producing a flow of treating fluid along said path of movement and in engagement with said film to treat said film and propel the same through said path of movement; means at the entering end of said path of movement for limiting the speed at which the film may be drawn into said path of movement, said limiting means comprising a sprocket engaging said film and a rotatable member movable at a controlled speed, with means connecting said sprocket and said rotatable member in such a manner that said sprocket can not be rotated faster than said rotatable member; sprocket means connected to said sprocket so as to rotate in synchronism therewith, said sprocket means engaging said film at the exit end of said path of movement; and yieldable means between said sprocket and said sprocket means for producing a positive tension in said film.

14. A film treating device of the character described, including: film treating means through which the film to be treated is extended; a control sprocket; means for holding the entering end of said film in engagement with said sprocket; means for holding the leaving end of said film in engagement with said sprocket; a film feeding reel adapted to be moved between operative and inoperative positions; an auxiliary sprocket between said control sprocket and said film feeding reel; yieldable means for holding a loop of film between said control sprocket and said auxiliary sprocket; and means for holding said auxiliary sprocket stationary when said film feeding reel is in inoperative position.

15. A film treating device of the character described, including: film treating means through which the film to be treated is extended; a control sprocket; means for holding the entering end of said film in engagement with said sprocket; means for holding the leaving end of said film in engagement with said sprocket; a film feeding reel; a film take-off reel; means for moving said film feeding reel and said film take-off reel between operative and inoperative positions; auxiliary sprockets between said film feeding reel and said film take-off reel and said control sprocket; movable means between said auxiliary sprockets and said control sprocket for forming film loops between the respective auxiliary sprockets and said control sprocket; and means for holding said auxiliary sprockets respectively stationary when the thereto related film reels are in inoperative positions.

16. A film treating device of the character described, including: a series of conduits connected together in consecutive order so that a film may be conducted continuously therethrough; and means for conducting a treating fluid primarily to the last of said conduits and then consecutively through the remainder of said conduits in reverse order.

17. A film treating device of the character described, including: a series of conduits connected together in consecutive order so that a film may be conducted continuously therethrough; and means for delivering a fluid through the last of said conduits in forward direction and then in reverse consecutive order through each of the preceding conduits so that the fluid will be finally discharged from the first of said conduits.

18. A film treating device of the character described, including: a conduit through which a film to be treated is extended; a fluid chamber member having its side wall connected to the end of said conduit in a plane above the bottom of said chamber member; a guide roller in said chamber member adjacent the end of said conduit; and a perforate wall in said chamber member under said guide roller.

19. A film treating device of the character described, including: film treating means into which a film to be treated is conducted; a sprocket for controlling the movement of said film into said film treating means; a rotary part in engagement with said sprocket; and means for simultaneously stopping said sprocket and releasing same from said rotary part.

20. A film treating device of the character described, including: film treating means into which a film to be treated is conducted; a sprocket for controlling the movement of said film into said film treating means; a rotary part in engagement with said sprocket; means for simultaneously stopping said sprocket and releasing same from said rotary part; a support for a film reel; and means located in proximity to said film reel for actuating said sprocket stopping means.

21. In a film treating device of the character described, a conduit structure including: a fitting having a tube-receiving bore; a tube of external diameter smaller than the internal diameter of said fitting; and a sealing member consisting of an annular wall of yieldable material mounted on the end of said tube and having an external diameter substantially the same as the internal diameter of said fitting.

22. In a film treating device of the character described, a conduit structure including: a fitting having a cylindrical wall comprised of co-operating parts separably secured together; a glass tube having an end portion of a diameter adapted to fit into the opening formed by said cylindrical wall, said end portion of said glass tube being flared outwardly at its extremity; and sealing means on the end of said glass tube comprising an annular wall of yieldable material having an external diameter substantially equal to the diameter of said opening.

23. A film-treating apparatus of the character described, including: means providing a path of movement for a pair of films; means for delivering a pair of films into said path of movement in contact; means for independently propelling said films through said path of movement; and means for subjecting said films to treating fluid during their movement through said path of movement.

24. A film-treating apparatus of the character described, including: a plurality of consecutive film-treating chambers through which a film to be treated may be conducted; guide rollers defining a path of movement for said film through said treating chambers, said guide rollers being movably mounted whereby to decrease the length of said path of movement; and releasable latch means for normally holding said guide rollers in position defining said path of movement.

25. A film treating apparatus of the character described, comprising: walls forming a treating chamber for containing a liquid; entering sprocket means at the forward end of said treating chamber over which a film may pass into such treating chamber; walls forming a drying chamber for a drying gas, said drying chamber being adjacent said treating chamber and receiving said film from said treating chamber; take-off sprocket means at the rear end of said drying chamber over which dry film may pass to a suitable receiver; and means for moving said liquid and said drying gas respectively through said chambers at sufficient velocity to move said film forwardly therein.

26. A film treating apparatus of the character described, comprising: walls forming a treating chamber for containing a liquid; entering sprocket means at the forward end of said treating chamber over which a film may pass into such treating chamber; walls forming a drying chamber for a drying gas, said drying chamber being adjacent said treating chamber and receiving said film from said treating chamber; take-off sprocket means at the rear end of said drying chamber over which dry film may pass to a suitable receiver; means for moving said liquid in said treating chamber at a velocity sufficient to propel said film; and means drivably connecting said sprocket means.

27. A film treating apparatus of the character described, comprising: walls forming a treating chamber for containing a liquid; entering sprocket means at the forward end of said treating chamber over which a film may pass into such treating chamber; walls forming a drying chamber for a drying gas, said drying chamber being adjacent said treating chamber and receiving said film from said treating chamber; take-off sprocket means at the rear end of said drying chamber over which dry film may pass to a suitable receiver; means for moving said liquid in said treating chamber at a velocity sufficient to propel said film; means drivably connecting said sprocket means; and means for mechanically exerting tension in the film which extends between said sprocket means.

28. A film treating apparatus of the character described, comprising: walls forming a treating chamber for containing a liquid; means for guiding said film into said treating chamber; walls forming a drying chamber for a drying gas, said drying chamber being adjacent said treating chamber and receiving said film from said treating chamber; take-off sprocket means at the rear end of said drying chamber over which dry film may pass to a suitable receiver; and means for moving said liquid in said treating chamber so as to move said film forwardly therein.

THOMAS M. INGMAN.
FRANK E. GARBUTT.
LEIGH M. GRIFFITH.